June 27, 1933.  E. C. PETSCH  1,915,615
STUBBLE BREAKER
Filed Sept. 5, 1929   2 Sheets-Sheet 1
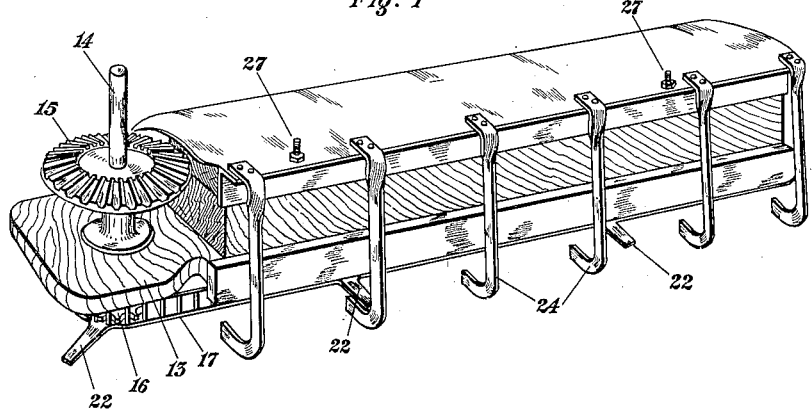
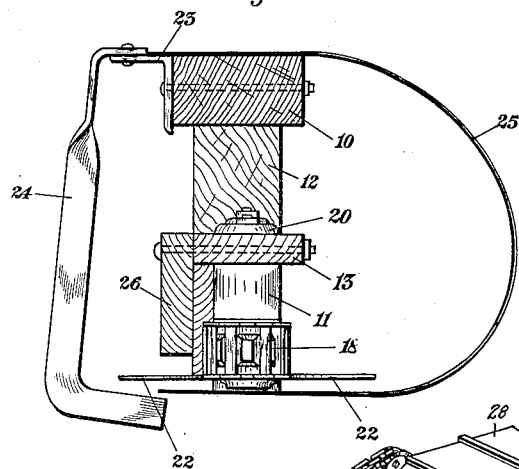
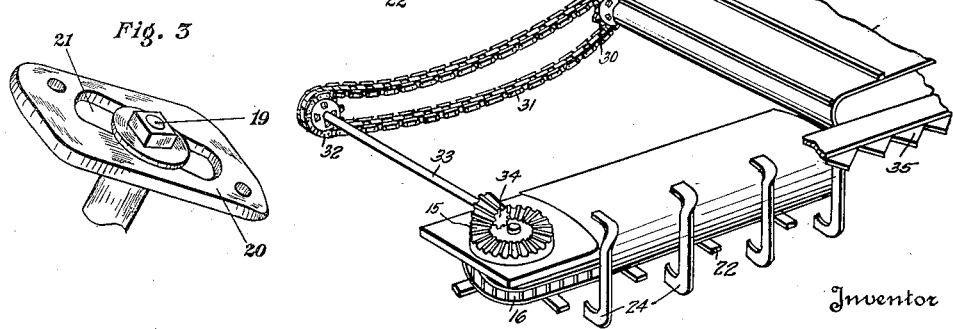
Inventor
E. C. Petsch
By Emil F. Lange
Attorney June 27, 1933.  E. C. PETSCH  1,915,615
STUBBLE BREAKER
Filed Sept. 5, 1929  2 Sheets-Sheet 2
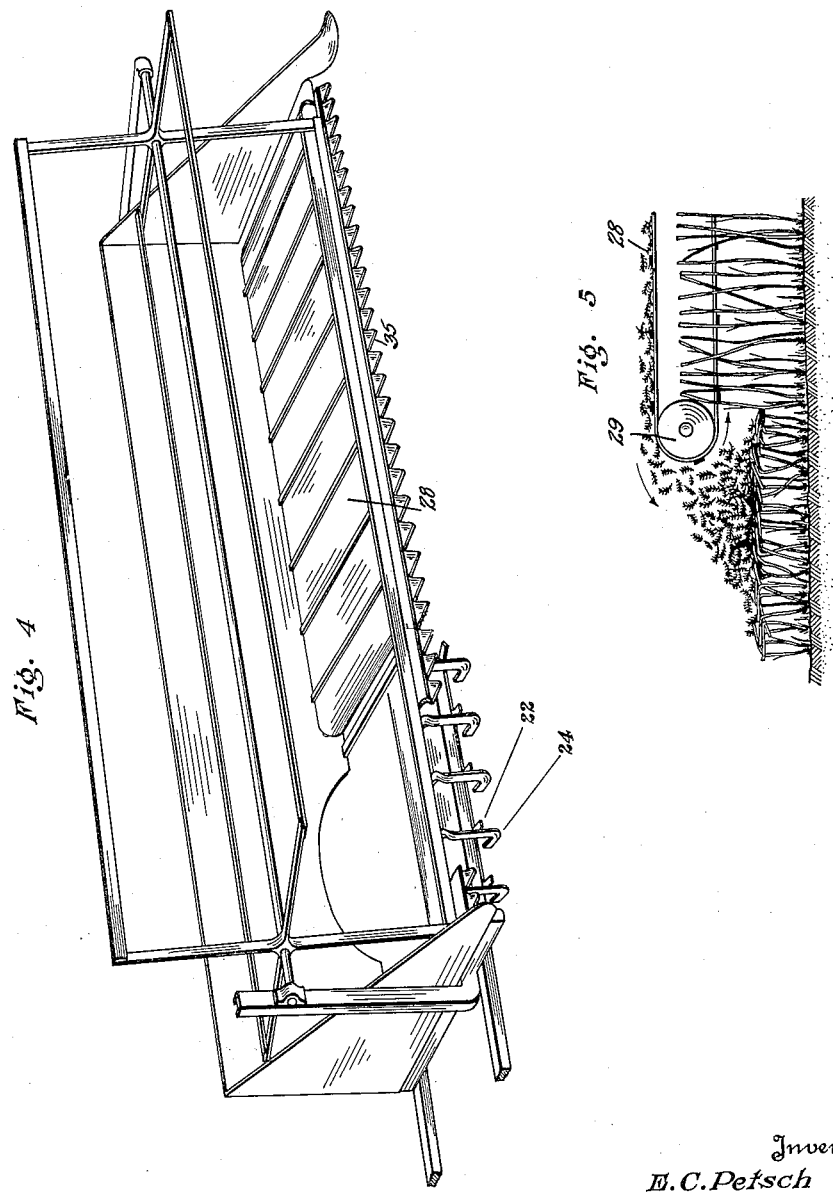
Inventor
E. C. Petsch
By Emil F. Lange
Attorney Patented June 27, 1933

1,915,615

UNITED STATES PATENT OFFICE

EVERETT C. PETSCH, OF PLEASANT DALE, NEBRASKA

STUBBLE BREAKER

Application filed September 5, 1929. Serial No. 390,567.

My invention relates to methods of harvesting grain and to a mechanism for carrying out the method.

The primary object of the invention is the provision of a method for harvesting small grains which consists in severing the heads from the stalks and in then breaking or bending the stubble at points spaced from the surface of the soil to form a platform for receiving the heads of the grain where the grain will be allowed to cure under the action of the wind and sun before being picked up for the thrashing machine.

Another object of my invention is the provision of a device for depositing the heads of grain in a windrow where it may be readily picked up before thrashing.

Another object which I have in view is the provision of a device for breaking the stubble at a spaced distance from the surface of the soil so that the upper portions of the stalks will be inclined from the vertical in a manner such that the upper portions of the stalks will form a substantially continuous platform on which the grain may be cured.

Having in view these objects and others which will be pointed out in the following description, I will now refer to the drawings, in which Figure 1 is a view in perspective of my stubble breaker.

Figure 2 is a view in end elevation of the same stubble breaker.

Figure 3 is a perspective view of the chain tightening members.

Figure 4 is a view in perspective of the harvesting members of any harvesting machine and showing my attachment in place thereon.

Figure 5 is a sectional view of a fragment of the harvest field showing particularly the platform which is formed by bending the grain stalks and on which the heads of grain are deposited.

Figure 6 is a view in perspective of a fragment of the grain platform and of the sickle, showing particularly the relation of the stubble breaker to these parts of the harvester and showing also one form of gearing which may be employed for driving the stubble breaker.

The frame of my stubble breaker includes an upper member 10 and a lower member 11 separated by two spacing members 12 and 13. The spacing member 13 projects to a slight distance beyond the other frame members, the end portions being provided with bearings for the shafts. The shaft 14 is the drive shaft, being provided with a bevel pinion 15 or other suitable driving means. At the lower extremity of the shaft 14 is a sprocket wheel 16 which carries a sprocket chain 17 passing around the idle sprocket wheel 18 at the opposite end of the stubble breaker. The sprocket wheel 18 is secured to a shaft 19 having its upper bearing in the plate 20 on the projecting end portion of the spacing member 13. As shown in Figure 3, means are provided for taking up the slack of the chain whenever this becomes necessary or desirable. The means shown in Figure 3 include the slot 21 in the plate 20 which is merely a conventional form of chain tightener. Other forms could obviously be substituted for the one shown. The chain 17 is provided with a plurality of arms 22 projecting outwardly.

Secured to the upper frame member 10 is an angle iron bracket 23 for supporting the curved arms 24. These arms are preferably formed from lengths of strap metal which is given a half twist in its upper portion and a bend in its lower portion. The relation between the arms 22 and 24 is best shown in Figure 2. They are spaced a slight distance from each other and they have an angular relation with each other. Stubble which is in the path of movement of the stubble breaker will be engaged between the stationary arms 24 and the moving arms 22 and it will be broken or bent so that the upper portion of the stubble will be inclined, usually at substantially right angles, to the lower portion of the stubble. When the stubble of the field has been broken, it will form a raised platform which is practically continuous and which is spaced from the surface of the soil.

The stubble breaker also includes an apron 25 which is preferably made from sheet metal. This apron is secured against the upper surface of the upper frame member 10 and against the lower surface of the lower frame member 11. Its upper surface is slightly inclined from front to rear and it is adapted to receive the grain from the cutter or from the apron of the implement, the grain to be delivered immediately in the rear of the apron 25. The stubble breaker also includes a frame member 26 which is bolted to the spacing member 13, the purpose of the frame member 26 being to prevent the straw from becoming tangled in the chain. The stubble breaker is also provided with means such as bolts 27 whereby the device may be secured to the implement.

My stubble breaker is adapted for use with such implements as combines and headers and the like. In attaching it to the implement by means of the bolts 27 I secure the stubble breaker immediately beneath the sickle and preferably at one end thereof. I then arrange the gearing in a manner such that the power from the implement will be delivered to the stubble breaker through the bevel gear 15 and through the shaft 14 to drive the chain 17. I also shorten the platform conveyor of the implement so that its delivery end is in close proximity to the end of the stubble breaker.

In applying the stubble breaker to the combine or binder or other harvester, the grain platform 28 is shortened as shown in Figure 4. This shortening is accomplished by shifting the roller 29, this being the roller at the delivery end of the platform 28. A sprocket 30 may be secured to the roller 29 and this sprocket may be employed for driving the sprocket chain 31 over the sprocket 32 to impart motion to the shaft 33 and thus to a gear 34 which drives the gear 15 of the stubble breaker. This arrangement of gearing, however, is optional since the form of gearing chosen must depend to a very large extent on the particular type of harvesting machine employed in carrying out my method.

Figure 5 illustrates the manner in which the heads of grain are deposited on the raised platform. The stalks at the right are grain stalks from which the heads have been severed by the sickle 35. These heads are carried on the platform 28 until they reach the roller 29. At this point the stalks have been broken and bent over to provide the raised platform shown at the left in Figure 5. The heads of grain falling on this platform will tend to maintain the horizontal portions of the platform to firmly support the heads which are subjected to the action of the air currents underneath the platform as well as to the action of the sun above for curing the grain in the heads.

The stalks of small grains such as wheat, oats, rye, and barley and similar grains are relatively tough so that a break in the stalk does not sever the stalk. The break merely results in an angular relation between the two parts of the stalks which still hang together. The stubble breaker as above described has a shearing action on the stubble but this shearing action, due to the fact that the shearing members are spaced apart, merely breaks the stalk without severing it. As the stubble breaker moves over the field, it breaks all of the stalks in its path and leaves the upper portions of all of the stalks in a substantially horizontal position. The free end portions of the stalks are sufficiently long so that they span the distances to the next stalks, the result being that they form a raised platform which is spaced a sufficient distance above the surface of the soil to permit the circulation of air. The stream of grain heads is fed onto this platform and the weight of the grain heads assists in maintaining the platform in position, the toughness of the stalks being such that they would tend to resume their upright position under certain atmospheric conditions except for the weight above them which holds them down. The loose mass of grain heads on the platform also permits the circulation of air within the mass so that the grain is rapidly dried out when resting on the platform. Should it rain during the curing process, the rain can have no appreciable effect since the drying out after the rain is very rapid. The platform has been found to be sufficiently tenacious to withstand the beating effect of a heavy rain on the mass of grain heads so that no appreciable quantity of grain is forced through the platform and against the surface of the soil.

Having thus described my invention in such full, clear, and exact terms that its construction and operation will be readily understood by others skilled in the art to which it pertains, what I claim as new and desire to secure by Letters Patent of the United States is:

1. The method of harvesting small grains which consists in severing the heads of the grain from the stalks in breaking without severing the stalks and in bending the stalks in a manner such that the upper portions of the stalks constitute a substantially continuous platform, the method further consisting in depositing the severed heads of grain in windrows on the said platform where the grain is cured by the action of the sun and air currents.

2. The method of harvesting grain which consists in severing the heads of grain from the stalks, in breaking the stalks without severing them at a predetermined point above the surface of the soil, in bending the upper portions of the grain stalks to occupy a position substantially perpendicular to the lower portions of the grain stalks to thereby provide a raised and substantially horizontal platform, the method further including the step of depositing the severed heads of grain on the raised platform of the upper portion of the stalks to permit the curing of the grain under the action of the sun and air currents.

3. The method of harvesting small grains which consists in severing the heads of the grain from the stalks, in breaking without severing the stalks at points spaced from the surface of the soil in a manner such that the upper portions of the stalks constitute a substantially continuous raised platform, the method further consisting in depositing the severed heads of grain in windrows on the said platform where the grain is cured by the action of the sun and air currents, and in finally gathering the heads of cured grain from the windrows.

In testimony whereof I affix my signature.

EVERETT C. PETSCH.